United States Patent [19]

Spinner

[11] 3,861,724

[45] Jan. 21, 1975

[54] DEVICE FOR THE ROTARY AXIALLY FIXED CONNECTION OF TWO CONCENTRIC COMPONENTS

[76] Inventor: Georg Spinner, Erzgiessereistr. 33, 8 Munich 2, Germany

[22] Filed: Mar. 6, 1973

[21] Appl. No.: 338,451

[30] Foreign Application Priority Data
Mar. 9, 1972  Germany............................ 2211451

[52] U.S. Cl. ................................................ 285/415
[51] Int. Cl. ............................................. F16l 23/00
[58] Field of Search ........... 285/415, 388, 387, 414, 285/DIG. 22, 363, 368, 412, 413, 276

[56] References Cited
UNITED STATES PATENTS
| | | | |
|---|---|---|---|
| 944,877 | 12/1909 | Koschinski...................... | 285/415 X |
| 1,655,382 | 1/1928 | Smith.............................. | 285/415 X |
| 1,987,499 | 1/1935 | Tabozzi........................... | 285/415 X |
| 2,263,655 | 11/1941 | Stettner .......................... | 285/388 |
| 2,907,590 | 10/1959 | Oswald ........................... | 285/415 X |
| 3,784,233 | 1/1974 | Hilbert............................ | 285/388 X |

FOREIGN PATENTS OR APPLICATIONS
807,719    1/1959    Great Britain...................... 285/388

*Primary Examiner*—Thomas F. Callaghan
*Attorney, Agent, or Firm*—Ostrolenk, Faber, Gerb & Soffen

[57] ABSTRACT

The specification describes a device for the rotary axially fixed connection of a tubular first component with a clamping second component surrounding the first component, and more particularly a coaxial plug connector. The connector is provided with a clamping flange or a nut with an internal shoulder with a split expanding holding ring fitting into annular grooves of the two components. The outer groove of the tubular part or the inner groove of the clamping part, which retain the holding ring radially in both directions positively, is open to the rear and to the front. There is an adjacent broadened out part arranged so that on axial displacement of the clamping component the holding ring is pressed over the broadened part into the opposite groove which is axially limited on both sides.

11 Claims, 2 Drawing Figures

DEVICE FOR THE ROTARY AXIALLY FIXED CONNECTION OF TWO CONCENTRIC COMPONENTS

The invention relates to a device for the rotary axially fixed connection of a tubular first component with a clamping second component surrounding the first component, more particularly of a coaxial plug connector with a clamping flange or a nut with an internal shoulder with a split expanding holding ring fitting into annular grooves of the two components.

In the case of prior art devices of this type the outer peripheral groove of the inner component is made so deep that the holding ring in the form of a slit expanding ring can be so pressed into the groove that it is completely taken up by it and the outer component can be slid over into position. If the outer groove comes to lie in alignment with the inner groove of the outer component, the expanding ring springs resiliently into the inner groove in an outward direction and comes to rest against the bottom surface of the groove and in this locked condition the expanding ring lies for half its radial breadth in the outer groove and for half in the inner groove and thus provides for a rotary connection which is radially fixed axially in a positive manner in both directions.

The disadvantage of these constructions lies in that a free radial annular space is left between the radially inner face of the expanding ring and the bottom of the outer groove in the inner part and into this space the expanding ring can be pressed, if a substantial axial load is applied to the clamping part with the consequence that the ring no longer fits into the inner groove of the clamping part and thus the positive connection ceases to exist.

One aim of the invention is that of preventing a springing out of the expanding ring or of the other holding ring respectively from the groove and to provide a connection which can withstand high axial loads.

In order to achieve this and other aims the invention consists in a device for the rotary axially fixed connection of a tubular first component with a clamping second component surrounding the first component, more particularly of a coaxial plug connector with a clamping flange or a nut with an internal shoulder with a split expanding holding ring fitting into annular grooves of the two component, characterised in that the outer groove of the tubular part or the inner groove of the clamping part, which retain the holding ring radially in both directions positively, is open to the rear and to the front and there is an adjacent broadened out part arranged so that on axial displacement of the clamping component the holding ring is pressed over the broadened part into the opposite groove which is axially limited on both sides.

Since the holding ring fits completely into the two grooves in the clamped condition, that is to say it rests firmly against the bottoms of both grooves and is thus held in both directions, any radial "give" of the holding ring is out of the question even in the case of extreme axial loading. While in the case of prior art connections the force tending to displace the expanding ring into the groove is only countered by the resilience of the expanding ring, in accordance with the invention a positive fixation is provided for, which reliably stops any pressing in of the expanding ring. In this respect the depth of the two grooves does not have to correspond precisely to the radial dimension of the holding ring and large tolerances can be allowed in order to facilitate assembly, that is to say the sum of the groove depths can somewhat exceed the radial dimension of the expanding ring. There is the provision more especially that the open groove prepared for receiving the holding ring axially should not be widened from the bottom of the groove and instead the shallow ring connecting land is provided which during storage and transport prevents any axial sliding back of the clamping component and supports the holding ring in a backward direction in a positive manner. In order to permit assembly it is necessary in this case for the sum of the groove depths to exceed the radial dimension by the height of the connecting land. As regards the provision of an abutment to the rear, the prior art fixing means can be used because this is quite sufficient as there are no clamping forces to be taken up and it is only a question of resisting sliding down.

The groove open to the rear is preferably provided on the inner component while the groove which is closed on both sides is provided in the outer clamping or holding part, for example a flange or a nut with an internal shoulder. In accordance with another feature of the invention a conical or transition section adjoins this open groove and merges from a cylindrical surface of the inner tubular body, whose diameter corresponds to the internal diameter of the holding ring when this is compressed in an inward direction. The internal diameter of the holding ring in the compressed condition is equal to or less than the internal diameter of the outer clamping or holding part.

In the present specification there are references, on the basis of the prior art, to a groove receiving the holding ring and open to the rear (or to the front respectively), although in the present case it need not be a question of a groove in the usual sense of the word. Generally the front limiting wall of the "groove" mentioned can be formed by a radially, outwardly extending collar of the inner component, for example a coaxial plug connector, behind which the clamping part abuts. If the clamping flange or the nut with an internal shoulder can be pushed or slid onto such a plug component provided with a terminal outer collar, such an expanding ring connection is not needed. However, in many cases there is the problem of providing for the rotary attachment of a flange or a nut with an internal shoulder behind such a terminal collar, in which case this collar is only accessible from the front.

The invention finds particular application in the latter case of fixing a clamping flange or a nut with an internal shoulder behind a collar of a plug body which is only accessible from the front.

In what follows an embodiment of the invention is described with reference to the accompanying drawing.

Figure 1:
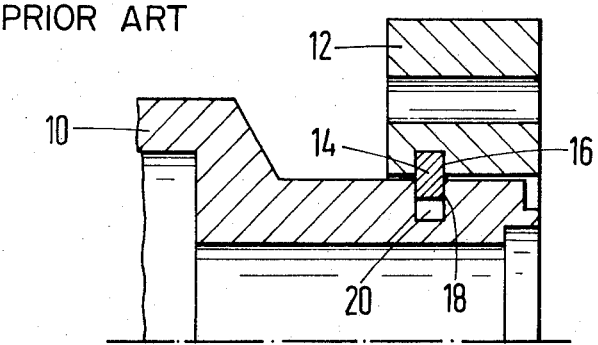
FIG. 1 shows a prior art expanding ring connection between a clamping or holding flange and a coaxial plug.

In the case of the connection of FIG. 1 representing the prior art, the connector body 10 is connected with the flange ring 12 by means of an expanding ring 14, which rests in an inner groove 16 of the flange and an outer groove 18 of the plug connector body 10. The outer groove 18 is of such a depth that the expanding ring 14 can be pressed so far into the groove that the flange 12 can be slipped over it into position 30 that the expanding ring 14, which tends to spring outwards, moves into the groove 16, leaving in this case an inner annular space 20, into which the expanding ring 14 may be displaced when a heavy load is applied with a resulting undoing of the connection.

Figure 2:
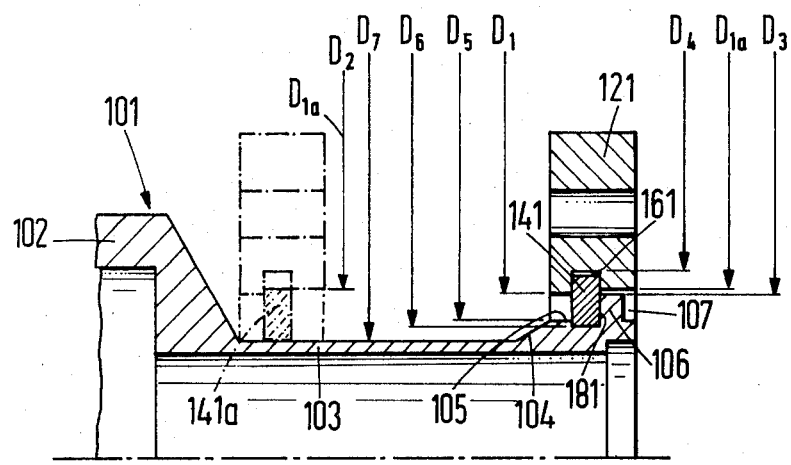
FIG. 2 shows a connecting device embodying the invention between a coaxial plug connector and a clamping flange fitting round it.

The plug body 101 in accordance with FIG. 2 has a section 102 which is widened out towards the rear, and this widening means that an attachment flange 121 or a nut with an internal shoulder cannot be placed on the section 102 from the rear. The section 102 adjoins a section 103 which is internally and externally cylindrical and widens out at a conical face 104, which in turn adjoins a cylindrical land 105 which terminates the groove 181 to the rear. The groove 181 receives the holding ring 141. To the front the groove 181 is terminated by an end collar 106 which projects forwards and at its front face is machined or turned down somewhat to provide a recess 107 for receiving a rubber sealing ring (not shown). The internal diameter $D_1$ of the flange 121 in the section lying behind the groove 161 is the same as or somewhat greater than the external diameter $D_3$ of the end collar 106 so that this flange can be slid into position from the front, that is to say from the right-hand side of the drawing, onto the plug body. The internal diameter $D_{1a}$ of the flange 121 in this section lying in front of its groove 161 is equal to the diameter $D_1$ or preferably, as shown, somewhat larger than it in order to facilitate insertion of the holding ring 141. In accordance with the embodiment shown the holding ring 141 is a two-piece ring in order to facilitate placing on the cylindrical part 103 of the plug body.

The holding ring 141, which preferably consists of two 180° segments, though it can be further subdivided, is so constructed so that it can be placed in position with its inner face on the cylindrical section 103 of the plug, which has the external diameter $D_7$. FIG. 2 shows such a holding ring 141a whose internal annular surface rests on the outer cylindrical face of the part 103. In this condition the holding ring 141 has an outer diameter $D_2$ equal to or somewhat smaller than the diameter $D_{1a}$ so that the flange 121 can be slid from the left over the holding ring 141a until the latter comes to lie at the same level as the groove 161. The ring 141a, which is still resting on the cylindrical part 103, abuts against the rear groove termination of the flange, because the diameter $D_1$ is made somewhat smaller than the diameter $D_{1a}$ and the external diameter $D_2$ respectively. Such a construction is admittedly not absolutely essential, but it facilitates assembly since, once the holding ring 141a has abutted against the rear groove end surface of the flange 121, the holding ring is automatically entrained by the displacement to the right of the flange. This holding ring then slides onto the conical surface 104, increases in diameter, and as a result it is pressed into the inner groove 161 of the flange 121. After the ring 141a has been spread on the conical surface 104, it is slipped onto the collar 105. This collar has a diameter $D_5$ which exceeds the diameter $D_6$ of the bottom of the inner groove 181 by an amount equal to the height of the cylindrical land 105. In order for the holding ring 141a to be expanded up to the diameter of this transition or land 105, the depth of the groove 161 must be increased in accordance with the height of the transition surface or land 105 so that when the ring 141 is in the operational state shown in FIG. 2, there is a certain amount of play in the radial direction. This, however, is not disadvantageous because the radial clearance is substantially smaller than the amount by which the holding ring would have to be pushed inwards in order to end the interlock. Although the clearance is so large that in the case of the application of a large clamping force directed towards the rear the flange could be pulled off owing to the ring moving into the clearance, such forces directed to the rear do not occur in practice owing to the purpose of use and to prevent displacement to the rear of the flange during transport the indicated interlocking engagement via the face or land 105 is completely adequate. Since the holding ring is no longer precisely circular after bending outwards, it rests partly on the bottom of the external groove 161 so that it cannot fall out to the rear either.

The construction in accordance with the invention makes it possible to make the holding ring 141 very wide in the axial direction and to subject it to loads precisely at the diameters $D_1$ and $D_3$ respectively. The ring can therefore not be drawn into a squew position and cannot spring out of position.

What I claim is:

1. A device for axially fixedly connecting, while permitting relative rotation, of a first tubular shaped component and of a second hollow clamping component that is surrounding said first component, said device comprising:

said first component having a first annular groove thereabout; said first groove facing toward said second component; said second component having a second annular groove therein, said second groove facing toward said first component; said grooves being alignable and facing toward each other upon insertion of said first component into said second component;

said first component having a front end which is the end to be fixedly connected and having a rear end away from said front end;

a selected one of said first and said second grooves being more open on its side toward said first component rear end than it is on its said side toward said first component front end, in that the said selected groove is defined by a front wall on its said front side and by rear wall on its said rear side; said rear wall being shorter in height than said front wall;

adjacent to said rear wall, its respective said device component having a broadened part which gradually changes in height, being tallest at said rear wall and being shorter further rearward from said rear wall;

an annular holding ring held in and extending between said first and said second grooves, having a radial height approaching the combined depth of said first and second grooves and having a diameter at that surface of said holding ring that engages said rear wall when said holding ring is being moved from said broadened part into said grooves, such that said rear wall projects slightly beyond that said ring surface, whereby said ring is pressed over said broadened part and then over said rear wall and moves into and is held in said aligned grooves.

2. A device in accordance with claim 1, wherein said broadened part has a conically tapering shape.

3. A device in accordance with claim 1, wherein it is said first component that includes said front and said rear walls and said first groove is said selected groove.

4. A device in accordance with claim 3, wherein further rearward of the shorter end of said broadened part is a cylindrical section of narrowed width.

5. A device in accordance with claim 3, wherein said holding ring is composed of resilient material and is normally biased toward and into said first groove.

6. A device in accordance with claim 3, in which said holding ring comprises at least two segments adapted to be mounted on the outer diameter of said cylindrical section.

7. A device in accordance with claim 3, in which said holding ring is an elastic, split, resilient ring adapted to spring inwards and outwards.

8. A device in accordance with claim 7, wherein said front wall is a collar terminating the front end of said first groove, said front wall having a first outer diameter;

said second component including a third wall that is forward of said second groove and including a fourth wall that is rearward of said second groove; said third and fourth walls each having respective inner diameters that are greater than said first outer diameter.

9. A device in accordance with claim 8, wherein said holding ring has a second outer diameter that is greater than said front wall first outer diameter when said holding ring in said grooves and said fourth wall inner diameter being smaller than said second outer diameter.

10. A device in accordance with claim 9, wherein said broadened part has a conically tapering shape.

11. A device in accordance with claim 10, wherein said holding ring is comprised of resilient material;

said rear wall having a flat top surface with a third outer diameter that is less than said first outer diameter, and the respective said first groove has a depth to a bottom that is at a fourth outer diameter of said first groove; said fourth outer diameter is a first length shorter than said third outer diameter; said second groove also having a depth that is related to the radial thickness of said holding ring such that with said holding ring resiliently resting against said bottom of said first groove, the distance between said second outer diameter and the bottom of said second groove is said first distance.

* * * * *